United States Patent
Fujimoto

(10) Patent No.: US 7,949,897 B2
(45) Date of Patent: May 24, 2011

(54) OPTICAL DISC RECORDING AND REPRODUCING APPARATUS

(75) Inventor: Shojiro Fujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 563 days.

(21) Appl. No.: 11/976,705

(22) Filed: Oct. 26, 2007

(65) Prior Publication Data

US 2008/0114917 A1 May 15, 2008

(30) Foreign Application Priority Data

Nov. 15, 2006 (JP) .................................. 2006-308884

(51) Int. Cl.
*G06F 11/00* (2006.01)

(52) U.S. Cl. ........................................... 714/14; 714/15

(58) Field of Classification Search .................... 714/14, 714/15, 16, 20, 22
See application file for complete search history.

(56) References Cited

U.S. PATENT DOCUMENTS

| | | | | |
|---|---|---|---|---|
| 5,799,206 A | * | 8/1998 | Kitagawa et al. ............... | 710/36 |
| 6,246,829 B1 | | 6/2001 | Nakagawa | |
| 6,408,400 B2 | * | 6/2002 | Taketa et al. ...................... | 714/5 |
| 6,697,310 B1 | * | 2/2004 | Kuriuzawa et al. ........ | 369/53.11 |
| 7,003,620 B2 | * | 2/2006 | Avraham et al. ............... | 711/103 |
| 7,490,259 B2 | * | 2/2009 | Saitoh ................................ | 714/2 |
| 2005/0281156 A1 | * | 12/2005 | Watanabe .................. | 369/47.11 |
| 2006/0007816 A1 | * | 1/2006 | Jeong ............................ | 369/47.1 |
| 2007/0195661 A1 | * | 8/2007 | Raaymakers ............... | 369/44.32 |

FOREIGN PATENT DOCUMENTS

| | | |
|---|---|---|
| JP | H06-274900 | 9/1994 |
| JP | H10-289524 | 10/1998 |
| JP | 2004-516600 | 6/2004 |
| JP | 2006-134142 | 5/2006 |
| WO | WO 02/50829 A1 | 6/2002 |

* cited by examiner

*Primary Examiner* — Dieu-Minh Le
(74) *Attorney, Agent, or Firm* — Morgan, Lewis & Bockius LLP

(57) ABSTRACT

A predetermined power failure recovery process is carried out when power failure recovery data is determined to be present in a flash ROM when a power supply is turned on after a power failure. However, when a tray opening and closing key is pressed before completion of this power failure recovery process, it is determined that a power failure recovery process interruption request is received, and the power failure recovery process interruption request is displayed at a power failure recovery selection screen. When interruption of the power failure recovery process is selected on the power failure recovery selection screen, it is determined whether or not reading of predetermined units of data relating to the power failure recovery process from the optical disc 1 is complete. A power failure recovery interruption process is then carried out after completion. A tray is then automatically opened when the power failure recovery interruption process is complete.

8 Claims, 5 Drawing Sheets

FIG. 4

POWER FAILURE RECOVERY SELECTION SCREEN

INTERRUPT THE POWER FAILURE RECOVERY PROCESS AND OPEN THE TRAY?

YES OR NO

PLEASE NOTE THAT RECOVERY OF DATA RECORDED TO THE DISC CANNOT BE GUARANTEED WHEN THE POWER FAILURE RECOVERY PROCESS IS INTERRUPTED.

OPTICAL DISC RECORDING AND REPRODUCING APPARATUS

This application is based on Japanese Patent Application No. 2006-308884 filed on Nov. 15, 2006, the contents of which are hereby incorporated by reference.

BACKGROUND OF THE INVENTION

1. Field of the Invention

The present invention relates to an optical disc recording and reproducing apparatus for recording and reproducing information to and from an optical disc, and particularly relates to an optical disc recording and reproducing apparatus having a function capable of interrupting a power failure recovery process when a power failure occurs during recording.

2. Description of Related Arts

In recent years, DVDs (Digital Versatile Discs) that are optical discs capable of recording large amounts of image and audio data etc. such as for movies have become widespread. Well known types of DVDs include DVD-ROMs where information is recorded on the manufacturer side and cannot be over-written on the user side, DVD-Rs or DVD+Rs where information can be recorded one time on the user side, and DVD-RWs, DVD+RWs or DVD-RAM etc. where information can be re-written any number of times on the user side. The information recorded on these DVDs can be reproduced by an optical disc reproducing apparatus (a DVD player) or an optical disc recording and reproducing apparatus (DVD recorder). Recording of information to a DVD-R, DVVD+R, DVD-RW, DVD+RW, and DVD-RAM is possible using an optical disc recording and reproducing apparatus (DVD recorder).

In the optical disc recording and reproducing apparatus, when a recording error occurs during recording of data in the event of recording data to a minus format DVD such as a DVD-R or DVD-RW, or to a plus format DVD such as a DVD+R or a DVD+RW, a predetermined number of retries take place for an address that cannot be written to. When writing cannot be achieved even after a predetermined number of retries, then that address is skipped and recording of data to a subsequent address is then attempted. Further, during reproduction, when reading is not possible for the address the recording error has occurred for even after a predetermined number of retries, this address is skipped and it is attempted to read data from a subsequent address.

However, in the event that a power supply of an apparatus is suddenly cut as a result of a power failure while recording is performed to record information to an optical disc in an optical disc recording and reproducing apparatus, operation of the apparatus stops abruptly. The optical disc recording and reproducing apparatus then enters a power failure recovery process when the power supply of the apparatus is turned on again. However, when a power failure recovery process is entered in the optical disc recording and reproducing apparatus of the related art, normal operation cannot be returned to until the power failure recovery process ends normally. This means that a user then has to wait until the power failure recovery process is complete when a user wishes to perform a desired operation.

For example, when a power failure occurs while a certain television program is being recorded onto an optical disc for two hours, five hours, or ten hours, so that the apparatus stops, if the power supply is then recovered and a power failure recovery process is carried out, the length of time for the power supply recovery process is the same as the recording time of two hours, five hours, or ten hours. The user is then unable to carry out any operations they wish to perform during this period. However, the configuration is such that the power failure recovery process is entered again when the power is turned on again as a result of a normal power key operation even after the power supply is turned off as a result of a normal power key operation or as a result of a power plug of the apparatus being removed from a power outlet once the apparatus enters the power failure recovery process. The above problems are therefore not solved.

When power failure occurs during recording with optical disc recording and reproducing apparatus of the related art, a power failure recovery process is carried out and it is intended to recover recording content up to when the power failed. However, a situation where other operations such as, for example, recording and reproduction cannot be carried out is prolonged when the power failure recovery process is entered because this process takes a long time as described above. This means that the user has to wait unnecessarily until the power failure recovery process is complete, which is detrimental to ease of use.

JP-A-2006-134142 of the related art discloses a technology where, when it is detected that power is no longer being supplied as a result of a power failure, etc, an automatic completion process is carried out where the power required to carry out the automatic completion process is supplied by a back-up power supply apparatus and the power is turned off after the automatic completion process is complete. However, there is the possibility that it is not possible to completely carry out the automatic completion process when a secondary battery contained in the back-up power supply apparatus was not charged sufficiently. Further, when the secondary battery deteriorates so that there is no longer any electrical power stored, it is not possible to carry out the automatic completion process. In this case, after the power supply is recovered, it is necessary to carry out the power failure recovery process described above. It is therefore not possible to carry out other operations during the power failure recovery process. This means that the user has to wait unnecessarily until the power failure recovery process is complete, which is detrimental to the ease of use. Further, for example, when the optical disc recording and reproducing apparatus is provided with a back-up power supply apparatus, the optical disc recording and reproduction apparatus invites increases in costs, and it is necessary to provide sufficient space for providing the back-up power supply apparatus. This also means that the casing of the apparatus becomes larger.

SUMMARY OF THE INVENTION

In order to solve the problem described above, it is an object of the present invention to provide an optical disc recording and reproducing apparatus where, when power failure occurs during recording and the apparatus enters the power failure recovery process, a power failure recovery process can be forcibly stopped so that other operations can be carried out when a user operation to forcibly stop the power failure recovery process takes place.

In order to achieve the above objective, an optical disc recording and reproducing apparatus for recording and reproducing information to and from an optical disc of the present invention comprises a system controller. The system controller, while performing a power failure recovery process when a power supply goes off due to a power failure and is turned on again, carries out a power failure recovery interruption process to interrupt the power failure recovery process when a specific key operation is received. The system controller also accepts user operations as normal after completion of the power failure recovery interruption process so as to allow processing corresponding to the user operations to be executed.

According to the configuration described above, when a power failure occurs during recording and a power failure recovery process is entered, if a user operation to forcibly stop the power failure recovery process is present, the power failure recovery process is forcibly stopped, and other operations are made possible. It is therefore no longer necessary for a user to wait until the power failure recovery process is complete when the user wishes to carry out a desired operation, which improves ease of use for the user. Further, it is not necessary to provide back-up power supply apparatus, which means there are no increases in cost and a casing can also be made in a compact manner.

BRIEF DESCRIPTION OF THE DRAWINGS

FIG. 4 is a view illustrating content of a power failure recovery selection screen displayed on a display apparatus of the embodiment.

DETAILED DESCRIPTION OF PREFERRED EMBODIMENTS

Figure 1:
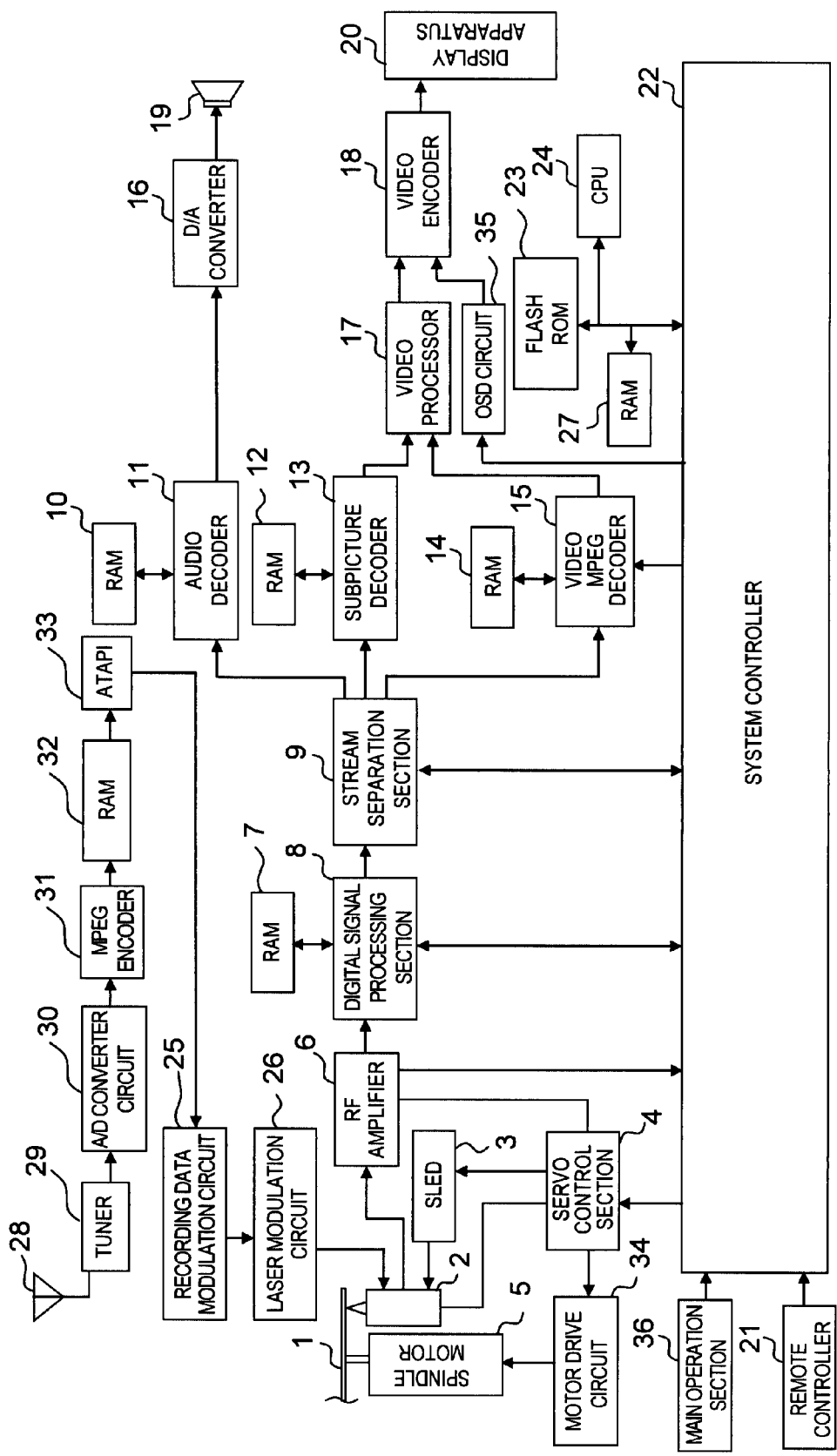
FIG. 1 is a block diagram showing the structure of an optical disc recording and reproducing apparatus taken as a DVD recorder according to an embodiment of the present invention.

An embodiment of the present invention will now be described with reference to the attached drawings. FIG. 1 is a block diagram showing the structure of an optical disc recording and reproducing apparatus taken as a DVD recorder according to an embodiment of the present invention.

In FIG. 1, this DVD recorder is provided with: a system controller 22 for controlling the apparatus as a whole; a spindle motor 5 for rotating the optical disc 1; an optical pick-up 2 for optically reading and writing information to and from the optical disc 1; a sled 3 for moving the optical pick-up 2 in a radial direction of the optical disc 1; and a servo control section 4 for carrying out control so as to drive the spindle motor 5 via a motor drive circuit 34 under the instruction of the system controller, drive the sled 3, and move an objective lens (not shown) built-into the optical pick-up 2, so as to move a position of a focal point of laser light in a vertical direction and a horizontal direction with respect to the recording surface of the optical disc 1.

The DVD recorder is also provided with: an RF amplifier 6 for amplifying an RF signal as a signal read from the optical pick-up 2 at the time of reproduction from the optical disc 1; a digital signal processing section 8 for, after converting the RF signal outputted from this RF amplifier 6 into digital data, performing signal demodulation processing and error correction processing in accordance with the data format of the optical disc 1 to store the generated data in a RAM 7; and a stream separation section 9 for separating audio data, subpicture data, and video data from a data stream outputted from the digital signal processing section 8 under the instruction of the system controller 22.

This DVD recorder is also provided with: an audio decoder 11 for performing predetermined decoding processing upon receiving the audio data outputted from the stream separation section 9; a RAM 10 for temporarily storing data for performing the decoding processing in the audio decoder 11; a subpicture decoder 13 for performing predetermined decoding processing upon receiving the subpicture data outputted by the stream separation section 9; a RAM 12 for temporarily storing data for performing the decoding processing in the subpicture decoder 13; a video MPEG decoder 15 for performing predetermined decoding processing in accordance with MPEG standard upon receiving the video data outputted from the stream separation section 9; and a RAM 14 for temporarily storing data for performing the decoding processing in the video MPEG decoder 15.

The DVD recorder is also provided with: a video processor 17 for synthesizing data outputted from the video MPEG decoder 15 and data outputted from the subpicture decoder 13 according to the instructions from the system controller 22; a video encoder 18 for converting the synthesized data outputted from the video processor 17 into a video signal for display on a display apparatus 20; and a D/A converter 16 for converting data outputted from the audio decoder 11 into an analog audio signal and then supplying the audio signal to, for example, a loudspeaker 19 through an audio circuit (not shown).

The DVD recorder is also provided with: a remote control unit 21 having various operation keys such as a video recording key for providing a video recording instruction to the system controller 22, a reproduction key for providing a reproduction instruction, and a stop key for providing an instruction to stop video recording or reproduction; and a main operation section 36 provided with fewer operation keys than the remote controller 21.

The DVD recorder is also provided with a flash ROM 23 for storing programs and data for controlling each configuration element of the apparatus and controlling the apparatus as a whole and/or for storing data for a user manual; a CPU 24 for controlling the system controller 22 for carrying out arithmetic processing in accordance with the programs and the data in the flash ROM 23; a RAM 27 for temporarily storing data necessary for the arithmetic processing of the CPU 24; and an OSD circuit 35 for subjecting the power failure recovery selection screen data etc. to OSD (On-screen display) processing when power failure recovery selection screen data stored in the flash ROM 23 is read out for displaying the power failure recovery selection screen on the display apparatus 20.

The DVD recorder is also provided with: a tuner 29 connected to an antenna 28; an A/D converter circuit 30 for converting analog video/audio signals of a television broadcast selected by the tuner 29 or video/audio signals outputted by a television receiver or another audio/visual output apparatus (not shown) into digital video/audio data; an MPEG encoder 31 for encoding the video/audio data while conforming to the MPEG standard; a RAM 32 that serves as a buffer memory for temporarily storing a predetermined amount of the encoded video/audio data (hereinafter, referred to as "encoded data"); an ATAPI (AT Attachment Packet Interface) 33 that serves as an interface between the RAM 32 and a recording data modulation circuit 25; the recording data modulation circuit 25 for modulating the encoded data transmitted from the ATAPI 33 for recording on the optical disc 1;

and a laser modulation circuit 26 for outputting a laser modulation signal to the optical pick-up 2 for modulating laser light based on the modulated data resulting from the modulation by the recording data modulation circuit 25.

The system controller 22 has the following as constituting elements that are features of this embodiment; a power failure recovery data present/absent determining section for, when the power supply is turned on, determining the presence or absence of power failure recovery data that was stored in the flash ROM 23 during recording of information to the optical disc 1; a power failure recovery processing section for carrying out a predetermined power failure recovery process when it is determined that power failure recovery data is present in the flash ROM 23; a power failure recovery process interruption request determining section for determining whether or not a tray opening and closing key 368 (refer to FIG. 2) is pressed down and, as a result, a power failure process interruption request is received while the power failure recovery process is not complete; a power failure recovery selection screen display processing section for displaying a power failure recovery selection screen on the display apparatus 20 when it is determined that the power failure recovery process interruption request is received; a power failure recovery interruption processing section for, when interruption of the power failure recovery process is selected on the power failure recovery selection screen, determining whether or not reading of predetermined units of data relating to the power failure recovery process from the optical disc 1 is complete, and carrying out a power failure recovery interruption process after completion; a power failure recovery interruption process completion determining section for determining whether or not the power failure recovery interruption process is complete; and a tray control section for opening a tray 367 when it is determined that the power failure recovery interruption process is complete.

Figure 2:
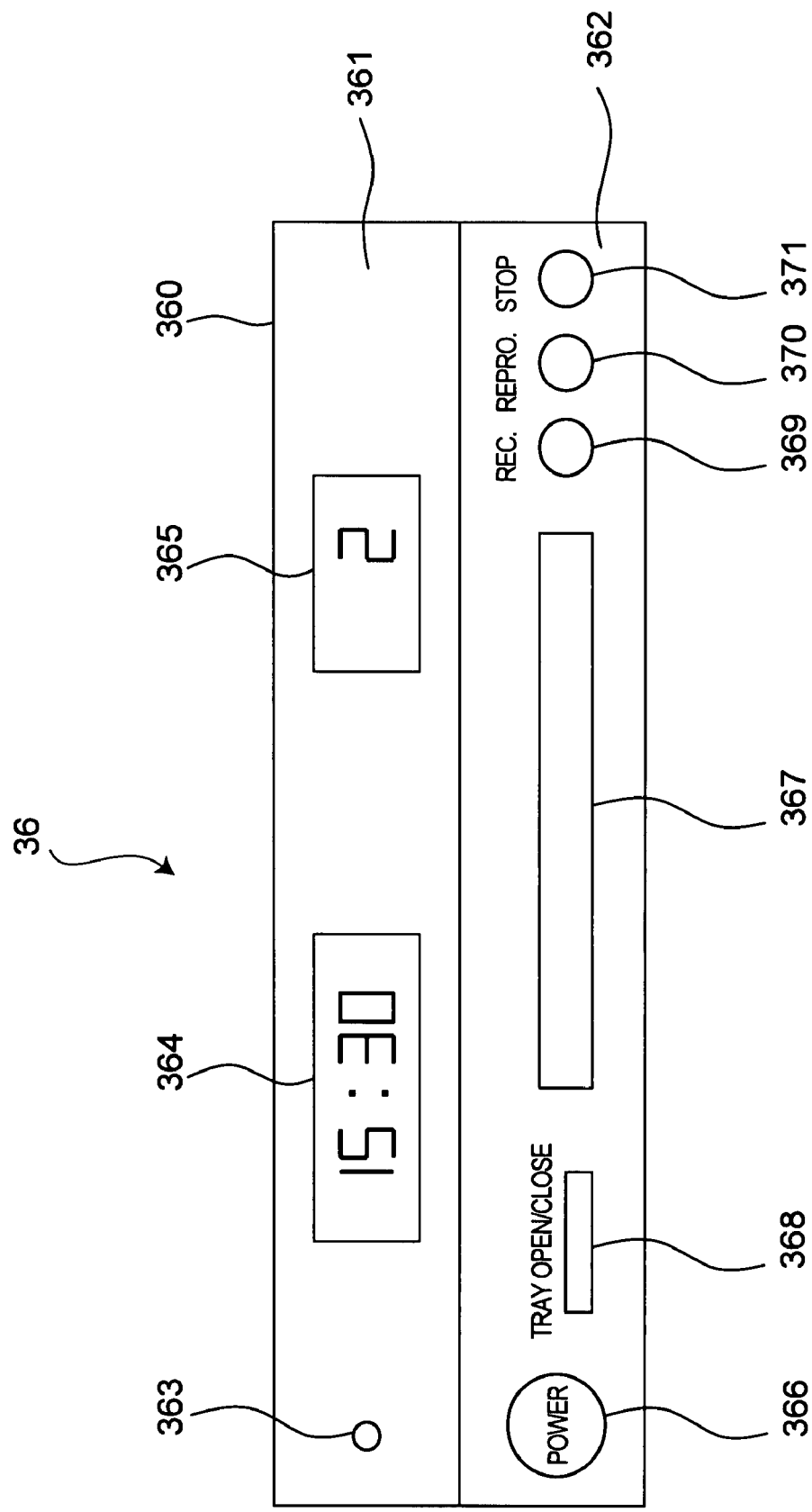
FIG. 2 is a structural view showing an example of a front operation panel of a main operation section of the DVD recorder of the embodiment.

FIG. 2 is a structural view showing an example of a front operation panel of the main operation section of the DVD recorder of the embodiment. In FIG. 2, a front operation panel 360 is comprised of a display section 361 and an operation section 362. There are provided in the display section 361 a power supply state displaying light-emitting diode 363 for emitting, for example, red light when the power supply is off and emitting, for example, green light when the power supply is on; a first display section 364 for displaying the time etc.; and a second display section 365 for displaying a selected channel etc. There are provided in the operation section a power supply key 366 for turning the power supply of the apparatus on and off; a tray 367 for withdrawing a DVD etc. from or inserting a DVD etc. into the apparatus; a tray opening/closing key (EJECT key) 368 for opening and closing the tray 367; a record key 369 for carrying out a recording operation; a reproduction key 370 for carrying out a reproduction operation; and a stop key 371 for stopping the recording operation or the reproduction operation etc. The arrangement and number of each configuration element on the front operation panel 360 are provided merely as an example and are by no means limiting.

Figure 3:
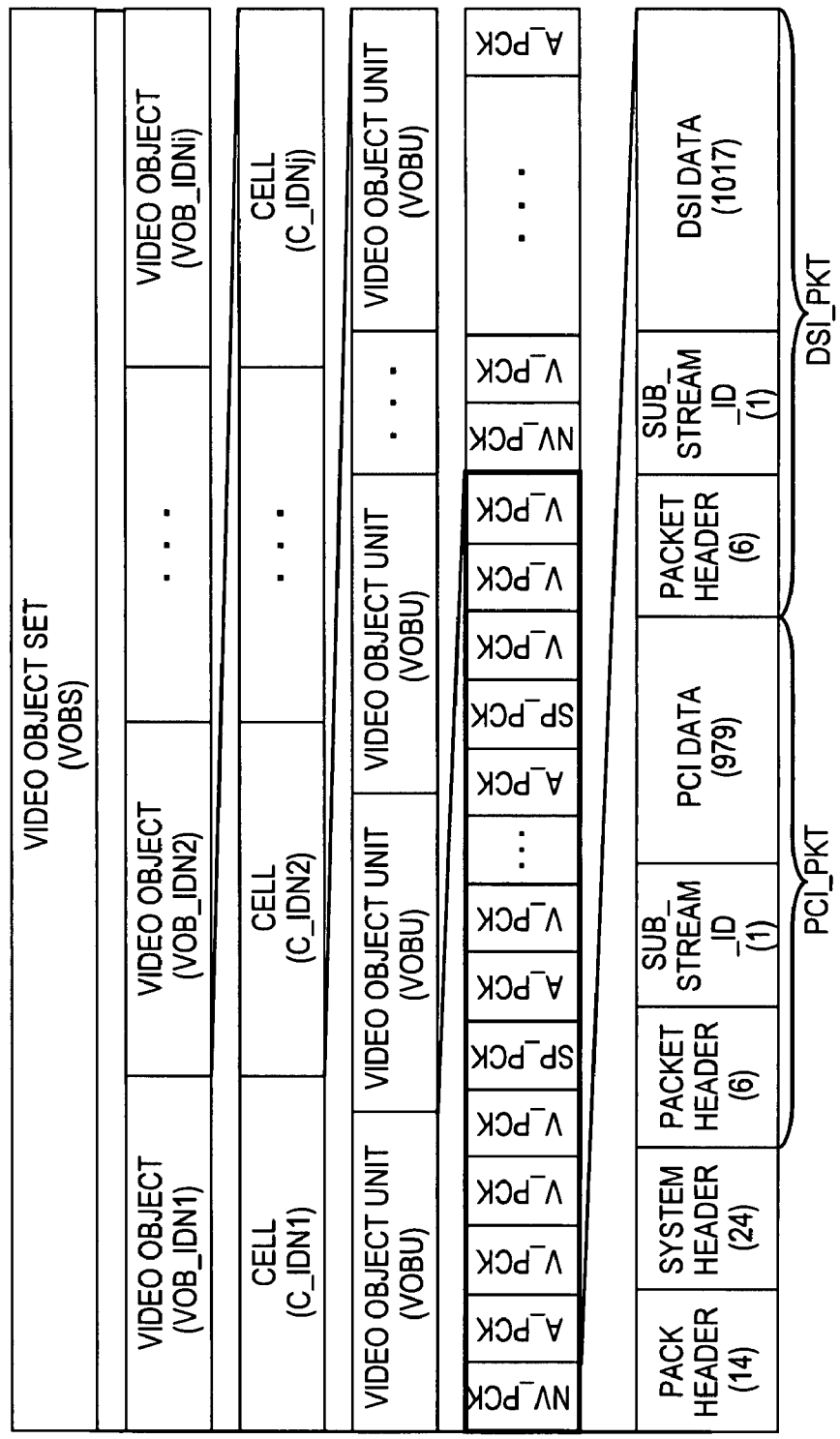
FIG. 3 is a view showing a structure for data recorded on a DVD video optical disc of the embodiment.

FIG. 3 is a view showing a structure for data recorded on a DVD video optical disc of the embodiment. In FIG. 3, a VOBS (Video Object Set) is comprised of a plurality of VOBs (Video Objects), i.e. VOB_IND1, VOB_IND2, . . . , VOB_INDi. The IND1, IND2, . . . , INDi indicate identification numbers. Each VOB is then constructed from a plurality of cells (Cell). For example, VOB_IND1 is comprised of a plurality of cells, C_IDN1, C_IDN2, . . . , C_IDNj. The IDN1, IDN2, . . . , IDNj indicate identification numbers.

For example, cell C_IDN1 is comprised of a plurality of VOBUs (Video Object Units). Each VOBU then contains NV_PCK (Navigation Pack), A_PCK (Audio Pack), V_PCK (Video Pack), and SP_PCK (Sub-Picture Pack).

The NV_PCK and the A_PCK are constructed from, for example, 2048 bytes respectively, of, for example, a fourteen byte pack header (Pack Header), a twenty-four byte system header (System header), a six byte packet header (Packet header), a one byte sub-stream identifier (Sub_stream_id), 979 bytes of presentation control information data (PCI data), six bytes of packet header (Packet header), one byte of sub-stream identifier (Sub_stream_id), and 1017 bytes of data search information data (DSI data).

A presentation control packet (PCI_PKT) has a six-byte packet header (Packet header), a one-byte sub-stream identifier (Sub_steam_id), and 979 bytes of presentation control information data (PCI data). A data search information packet (DSI_PKT) has a six-byte packet header (Packet header), a one-byte sub-stream identifier (Sub_steam_id), and 1017 bytes of data search information data (DSI data).

FIG. 4 is a view illustrating content of a power failure recovery selection screen displayed on a display apparatus of the embodiment. A message "Interrupt the power failure recovery process and open the tray? Yes or No. Please note that recovery of data recorded to the disc cannot be guaranteed when the power failure recovery process is interrupted." is then displayed on the power failure recovery selection screen. The power failure recovery process is then interrupted when the remote control unit 21 is operated and "Yes" is selected.

Figure 5:
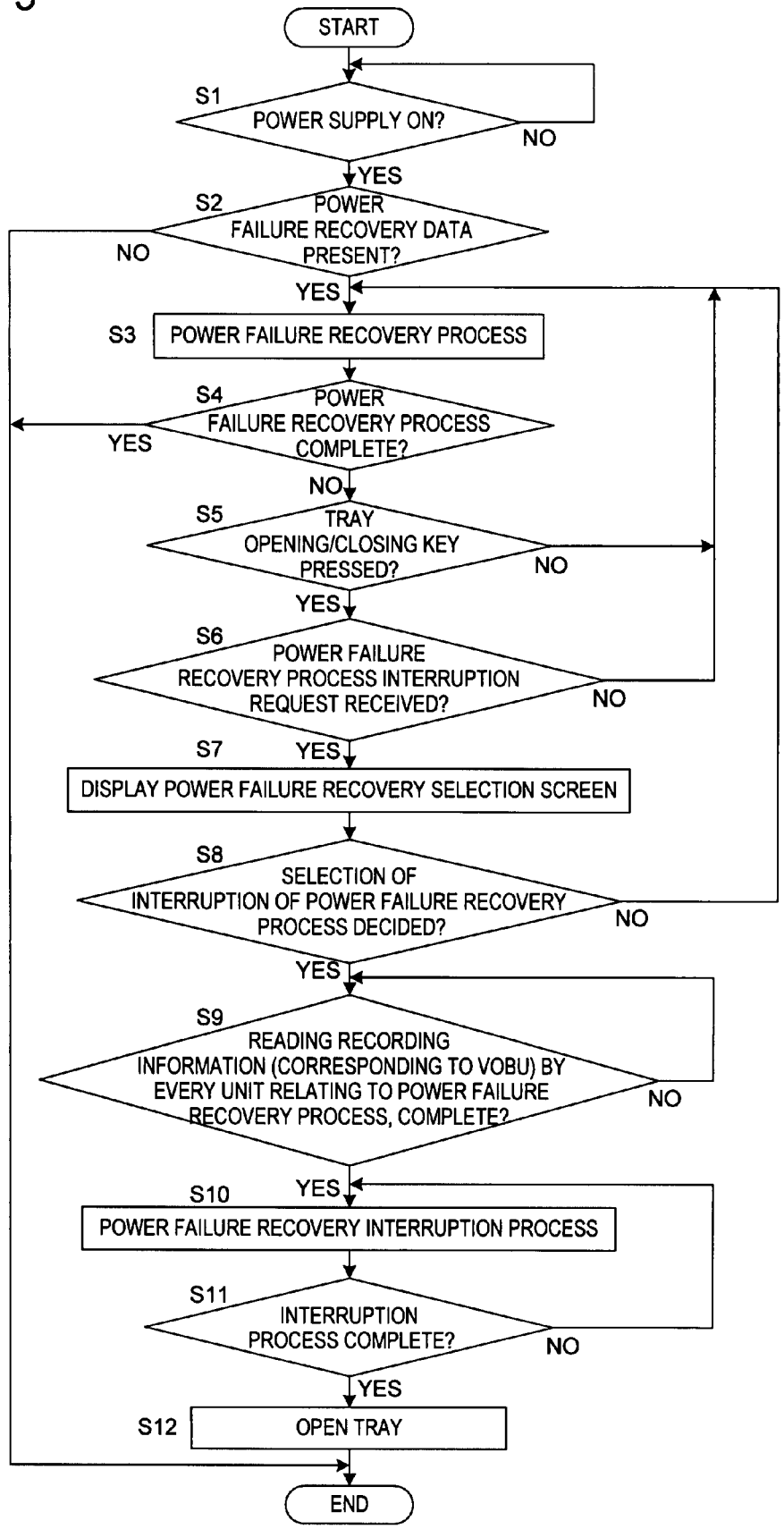
FIG. 5 is a flowchart illustrating processing for up to execution of a power failure recovery interruption process from a power supply of the apparatus being turned on again after the optical disc recording and reproducing apparatus stops as a result of power failure occurring during a recording operation in this embodiment.

FIG. 5 is a flowchart illustrating processing for up to execution of a power failure recovery interruption process from a power supply being turned on again after the optical disc recording and reproducing apparatus stops as a result of power failure occurring during a recording operation in this embodiment. A description is now given of the power failure recovery interruption process from the time the power supply of the apparatus being turned on again after the optical disc recording and reproducing apparatus stops as a result of power failure occurring during a recording operation in this embodiment with reference to this flowchart and FIG. 1 to FIG. 4.

First, the power supply of the apparatus is turned on as a result of the user operating the power supply key (not shown) of the remote control unit 21 or the power supply key 363 of the main operation section 36 (step S1). The power failure recovery data present/absent determining section of the system controller 22 then accesses the flash ROM 23 and determines the presence or absence of power failure recovery data in the flash ROM 23 (step S2). To be specific, when recording of information is being carried out to a recordable optical disc 1, data for address information and recording time information indicating how far recording has progressed for a region of the optical disc 1 every fixed time period is written to the flash ROM 23. More specifically, address information for sectors where data has been written for which recording is complete, and recording time information indicating recording time for up to the sectors for which recording is complete is written in. When recording is interrupted by a power failure, such information remains in the flash ROM 23 as power failure recovery data. The power failure recovery data present/absent determining section can then understand whether such data results from a power failure where the power supply went off a previous time or results from the power supply going off in a normal manner, by accessing the flash ROM 23 and determining the presence or absence of power failure recovery data in the flash ROM 23.

When it is determined by the power failure recovery data present/absent determining section that there is no power failure recovery data in the flash ROM 23, the power supply did not go off as a result of power failure and it is therefore not necessary to carry out the power failure recovery process. On the other hand, when power failure recovery data is determined to be present in the flash ROM 23, the power failure recovery processing section of the system controller 22 carries out the predetermined power failure recovery process (step S3).

In the predetermined power failure recovery process, the apparatus reads out recording information by every unit (VOBU described in FIG. 3 in the case of the DVD video specification) from the optical disc 1 based on the address information and the recording time information stored in the flash ROM 23 for temporary storage in the RAM 27. It is then confirmed whether the recording information (VOBU) by every unit is complete information (VOBU) in line with the disc specification. When incomplete information (VOBU) is read out, then a power failure occurred and recording was interrupted at this point in time. This is to say that recording was successfully completed and represented by certain complete information (VOBU) before such incomplete information (VOBU), and disc management information also including control information is written to the optical disc 1. By carrying out this kind of power failure recovery process, it is possible to reproduce recording information up to before the power failure even if recording of information onto the optical disc 1 is interrupted by a power failure.

While the power failure recovery process has not finished (step S4), when the tray opening and closing key 368 of the main operation section 36 is pressed by the user, the power failure recovery process interruption request determining section of the system controller 22 detects that the tray opening and closing key 368 has been pressed down (step S5). When it is determined that there is a power failure recovery process interruption request (step S6), the power failure recovery selection screen display processing section reads out the power failure recovery selection screen data from the flash ROM 23. Then the data is subjected to OSD processing by the OSD circuit 35 and converted by the video encoder 18 into an image signal which is then supplied to the display apparatus 20. The power failure recovery selection screen (refer to FIG. 4) is then displayed on the display apparatus 20 (step S7).

When the user then operates the remote control unit 21, selects "Yes" on the power failure recovery selection screen, and decides upon interruption of the power failure recovery process, the power failure recovery interruption processing section of the system controller 22 determines that interruption of the power failure recovery process is selected and decided at the power failure recovery selection screen (step S8). It is then determined whether or not reading of data (VOBU corresponding to the power failure recovery process) for the predetermined units relating to the power failure recovery process from the optical disc 1 is complete. When the reading is determined to be complete (step S9), a power failure recovery interruption process is carried out (step S10). When the power failure recovery interruption process is carried out, recovery of information (broadcast programs etc.) during the current recovery is given up, but a normal state is forcibly recovered instead.

The power failure recovery interruption process completion determining section of the system controller 22 then detects that the power failure recovery interruption process is complete (step S11). The tray control section of the system controller 22 then drives a tray drive mechanism (not shown) and opens the tray 367 (step S12). As a result of the above processing, the power failure recovery interruption process is complete. After this, the optical disc recording and reproducing apparatus accepts the user operation as usual and allows execution of processing corresponding to the user operation.

According to the embodiment described above, when a power failure occurs during recording so that an apparatus enters a power failure recovery process, if a user operation for forcibly stopping the power failure recovery process is present, the power failure recovery process is forcibly stopped and other operations are then made possible. When the user then wishes to carry out a desired operation, it is no longer necessary to wait until the power failure recovery process is complete, which improves ease of use for the user.

What is claimed is:

1. An optical disc recording and reproducing apparatus for recording and reproducing information to and from an optical disc, comprising a system controller,
   wherein the system controller, while performing a power failure recovery process when a power supply goes off due to a power failure and is turned on again, carries out a power failure recovery interruption process to interrupt the power failure recovery process when a specific key operation is received, and
   accepts user operations as normal after completion of the power failure recovery interruption process so as to allow processing corresponding to the user operations to be executed.

2. The optical disc recording and reproducing apparatus according to claim 1,
   wherein the system controller comprises:
   a power failure recovery data present/absent determining section for determining presence or absence of power failure recovery data stored in a memory during recording of information to the optical disc before the power failure, when the power supply is turned on after the power failure;
   a power failure recovery processing section for carrying out a predetermined power failure recovery process when it is determined that the power failure recovery data is present in the memory;
   a power failure recovery process interruption request determining section for determining whether or not a power failure process interruption request is received when a specific key is operated before completion of the power failure recovery process;
   a power failure recovery selection screen display processing section for displaying a power failure recovery selection screen on a display apparatus when it is determined that the power failure recovery process interruption request is received;
   a power failure recovery interruption processing section for, when selection of interruption of the power failure recovery process is decided on the power failure recovery selection screen, determining whether or not reading of a predetermined unit of data relating to the power failure recovery process from the optical disc is complete, and carrying out the power failure recovery interruption process after completion; and
   a power failure recovery interruption process completion determining section for determining whether or not the power failure recovery interruption process is complete.

3. The optical disc recording and reproducing apparatus according to claim 1,
   wherein the specific key operation is pressing down of a tray opening and closing key.

4. The optical disc recording and reproducing apparatus according to claim 2,
wherein the specific key operation is pressing down of a tray opening and closing key.

5. The optical disc recording and reproducing apparatus according to claim 1,
wherein the system controller further comprises a tray control section for automatically opening a tray when it is determined that the power failure recovery interruption process is complete.

6. The optical disc recording and reproducing apparatus according to claim 2,
wherein the system controller further comprises a tray control section for automatically opening a tray when it is determined that the power failure recovery interruption process is complete.

7. The optical disc recording and reproducing apparatus according to claim 3,
wherein the system controller further comprises a tray control section for automatically opening a tray when it is determined that the power failure recovery interruption process is complete.

8. The optical disc recording and reproducing apparatus according to claim 4,
wherein the system controller further comprises a tray control section for automatically opening a tray when it is determined that the power failure recovery interruption process is complete.

* * * * *